Patented Feb. 15, 1927.

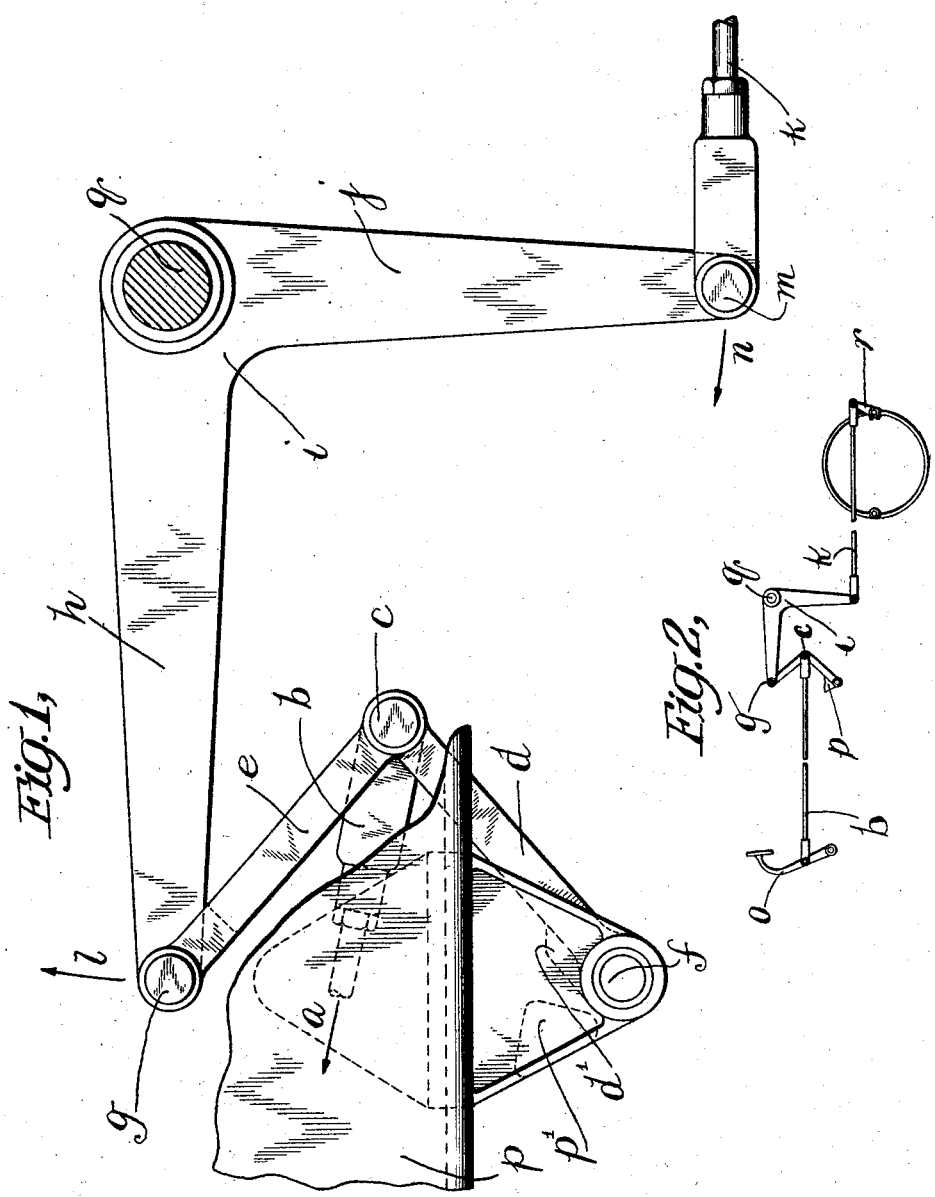

1,617,832

UNITED STATES PATENT OFFICE.

CLYDE W. ADAMS, OF NEW YORK, N. Y., ASSIGNOR TO INTERNATIONAL MOTOR COMPANY, OF NEW YORK, N. Y., A CORPORATION OF DELAWARE.

MECHANICAL MOTION.

Application filed May 22, 1926. Serial No. 110,901.

This invention relates broadly to mechanical motions and more particularly to operative connections between, say, a brake mechanism and the manually operative devices for the actuation of such mechanism with the object of increasing materially the pressure of the brake mechanism without increasing the manual effort at the brake pedal. Accordingly the foot pedal or other manually operable device is connected to a toggle joint, one arm of which is pivoted upon a relatively stationary axis and the other arm is pivotally connected to one arm of a bell-crank lever which is connected by its other arm to the brake mechanism. Thus as the brake pedal is depressed the toggle is straightened, causing the bell-crank to actuate the brake mechanism, the later movements of the toggle, as it approaches the "infinite plane", exerting a greatly increased pressure on the bell-crank proportionate to the relatively small pedal travel.

In order that the invention may be clearly understood and readily carried into effect, the same will now be described more fully with reference to the accompanying drawing illustrating a preferred embodiment thereof as applied to brake mechanism for motor vehicles, and in which:

Figure 1 is a view showing the mechanical motion comprising a toggle and a bell-crank.

Figure 2 is a view, on a reduced scale, showing the mechanical motion interposed in a brake mechanism for a vehicle.

Referring first to Figure 1 when a force is applied in the direction of the arrow $a$ on the link $b$, connected to the toggle joint $c$, the toggle formed of the two arms $d$, $e$, will be caused to straighten tending to push the pivots $f$, $g$, in opposite directions. If, now, the pivot $f$ is maintained relatively stationary, the reaction against the toggle may be availed of to cause the movement of the pivot $g$ in an upward direction. The object of the invention, however, is to obtain the effect in the same general direction as that of the force applied and to this end the arm $e$ is pivoted at $g$ to the arm $h$ of the bell crank $i$ the other arm $j$ of which is connected to the rod $k$. Then when the toggle is straightened the pivot $g$ will move in the direction of the arrow $l$ causing movement of the pivotal connection $m$ with the link $k$ in the direction of the arrow $n$. When the parts are in the position indicated in Figure 1, no great mechanical advantage is obtained but as the toggle is straightened and approaches the "infinite plane" slight movements of the toggle joint to the left (Figure 1) will greatly increase the outward pressure on the pivots.

This mechanical motion is particularly advantageous in connection with brake mechanism. In Figure 2 a brake pedal $o$ is shown as connected by the pull rod $b$ to the toggle joint $c$ which is pivoted on a vehicle frame at $p$ and is connected at $g$ to the bell-crank $i$ also rotatable as at $q$ on the frame. The other arm of the bell crank is connected by the pull rod $k$ to the brake shoe expanding devices $r$.

To prevent the toggle passing through its "infinite plane" the arm $d$ may be formed with a shoulder $d'$ adapted to abut against the stop $p'$ carried on the frame $p$.

By the construction described a mechanical motion is provided, particularly efficacious in situations where a greatly increased pressure is required proportionate to the distance through which the power may be applied. In brake mechanism, for instance, a gradual increase in the kinetic efficiency of manually operable devices is obtained.

Various applications of the mechanical motion forming the subject matter of the invention will occur to those skilled in the art and are to be deemed within the spirit and scope of the invention.

What I claim is:

1. The combination with a vehicle frame, of brake actuating mechanism in which the force applied to the brake increases gradually independently of the manually applied force and comprising, in combination, a foot pedal, a toggle, one link of which is pivoted on the frame, means to connect the foot pedal with the toggle joint, a bell-crank pivoted on the frame, a pivotal connection between the other toggle link and an arm of the bell crank, and means to connect the other arm of the bell-crank to the brake mechanism.

2. The combination with a vehicle frame, of brake mechanism, a foot pedal, a toggle, one link of which is pivoted on the frame, means to connect the foot pedal with the toggle joint, a bell-crank pivoted on the frame, a pivotal connection between the other toggle link and an arm of the bell-crank, means to connect the other arm of the bell-crank to the brake mechanism, and a stop carried on the frame against which a link of the toggle abuts.

This specification signed this 17th day of May A. D. 1926.

CLYDE W. ADAMS.